Figure 1:
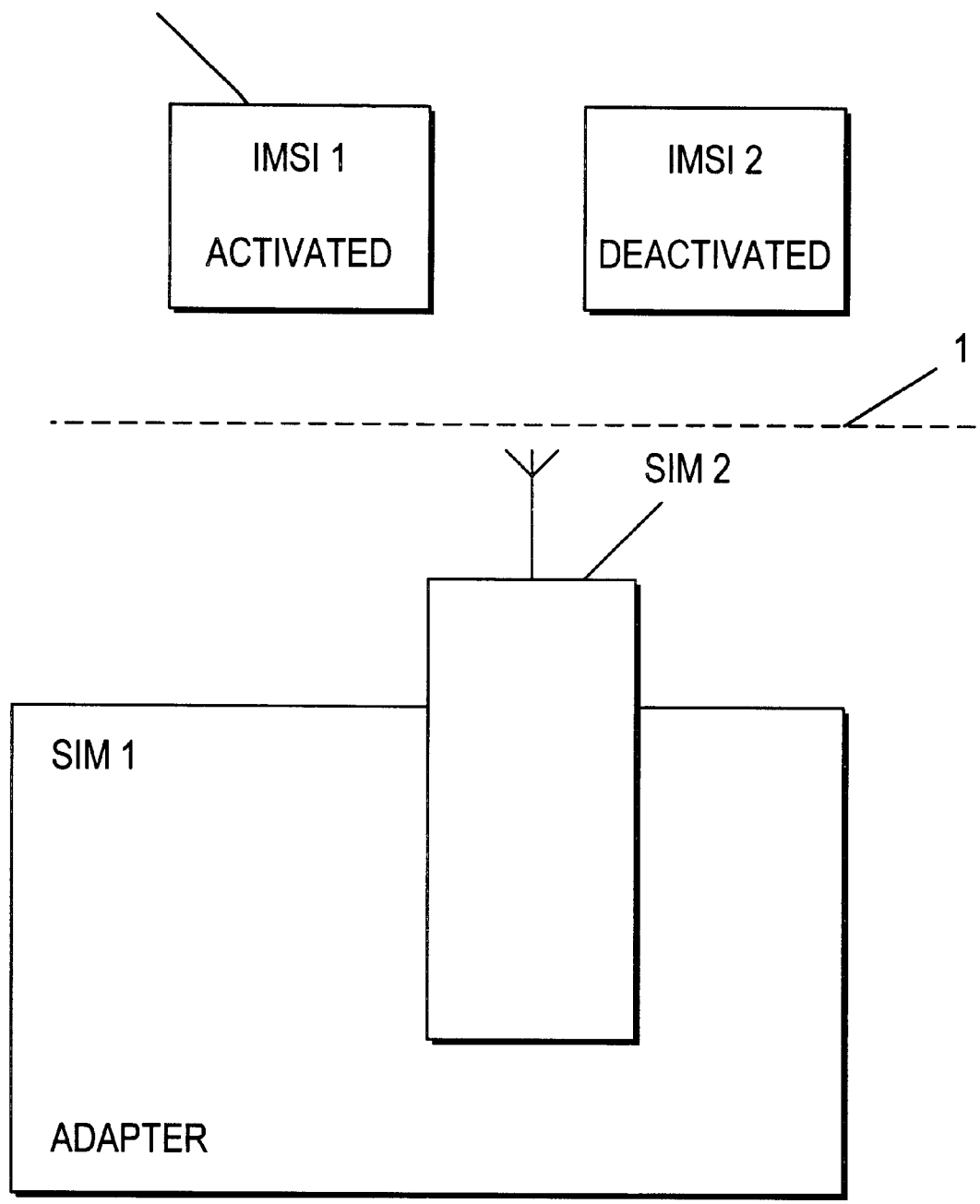

United States Patent [19]

Lahti

[11] Patent Number: 5,956,653
[45] Date of Patent: Sep. 21, 1999

[54] METHOD FOR CALLING BY A TERMINAL, LIKE A CARD CONTROLLED MOBILE STATION, OF A MOBILE COMMUNICATION SYSTEM

[75] Inventor: Aapo Lahti, Helsinki, Finland

[73] Assignee: Sonera OY, Helsinki, Finland

[21] Appl. No.: 08/817,124

[22] PCT Filed: May 12, 1995

[86] PCT No.: PCT/FI95/00254

§ 371 Date: May 12, 1997

§ 102(e) Date: May 12, 1997

[87] PCT Pub. No.: WO95/32590

PCT Pub. Date: Nov. 30, 1995

[30] Foreign Application Priority Data

May 13, 1994 [FI] Finland ................................. 942215

[51] Int. Cl.⁶ ................................................ H04Q 7/20
[52] U.S. Cl. ........................ 455/558; 455/432; 455/406; 455/435; 455/557
[58] Field of Search .................................. 455/557, 558, 455/559, 575, 405, 406, 407, 408, 409, 432, 433, 435, 551, 552

[56] References Cited

U.S. PATENT DOCUMENTS

| | | | |
|---|---|---|---|
| 5,359,182 | 10/1994 | Schilling | 455/407 |
| 5,428,666 | 6/1995 | Fyfe et al. | 455/551 |
| 5,537,474 | 7/1996 | Brown et al. | 455/411 |
| 5,657,373 | 8/1997 | Hermansson et al. | 455/435 |
| 5,675,628 | 10/1997 | Hokkanen | 455/433 |
| 5,729,537 | 3/1998 | Billstrom | 455/411 |

*Primary Examiner*—Wellington Chin
*Assistant Examiner*—Yemane Woldetatios
*Attorney, Agent, or Firm*—Cohen, Pontani, Lieberman & Pavane

[57] ABSTRACT

The invention relates to method for calling by a terminal, like a card controlled mobile station, of a mobile communication system, in which method the terminal is controlled by a SIM-card and the subscriber is identified from data of the said SIM-card. Characteristic for the invention is that by attaching a mobile station to special teleterminal adapter a local subscriber status is given to the mobile terminal.

5 Claims, 2 Drawing Sheets

METHOD FOR CALLING BY A TERMINAL, LIKE A CARD CONTROLLED MOBILE STATION, OF A MOBILE COMMUNICATION SYSTEM

The invention relates to a method for calling by a terminal, like a card controlled mobile station, of a mobile communication system according to the preamble of the claim 1.

In the system a connection can be accomplished between two subscribers, at least two of which is a mobile terminal. In a mobile communication system a message transmission is two directional and therefore the connection is accomplished between a A-subscriber and a B-subscriber. In the mobile communication system the centre is informed all the time about the locations of those phones, to which a call can be routed. Normally a call to a phone is made to a phone such that the A-subscriber dials a telephone number. The centre transmits a signal to the telephone of the B-subscriber. Depending on whether the B-subscriber has answered, not answered, busy or off the call is switched when the B-subscriber answers. Generally the mobile communication systems includes mobile telephone stations, at least one base station, which is provided for communication with a mobile telephone by a radio channel, and which has of a limited coverage area, at least one mobile telephone centre, which is provided for mobile telephone services, and which is capable to be interactive with telephone switching centres or branch exchanges.

When a call is made by a digital mobile telephone, the telephone is controlled by a card inserted into the telephone and the subscriber is identified from the data of the SIM-card inserted into the terminal, which data include the international mobile subscriber identity IMSI. In the card-controlled mobile terminals the international subscriber identity is dependent on the card. Thus the subscriber is identified based on the data if SIM-card inserted into the mobile terminal but not on the terminal itself The SIM-card may be a circuit card mounted stationary at the terminal or a small card or a big card having a size of a credit card, at which is joined the small card, detachable from the mobile terminal.

The aim by the invention is that any normal mobile telephone subscriber could call both mobile calls ordinarily and as placed to a certain location calls as a local subscriber via the same mobile station equipment or by the same telephone equipment calls of two types, which can be separated in the charging or another corresponding facility In order to accomplish the same the method according to the invention is mainly characterised in that presented in the characterising part of the claim 1.

New registers would not necessarily be needed in the mobile telephone centre. As a special embodiment a wireless local access could be accomplished, for which also a mobility is served as an additional feature. Further, as an advantage of the invention can be mentioned that the same is not bound with a network design, the same can be realised with low investments (no cable installations), because only the charging is renewed by utilising an ordinary method of chaining up. At the terminal side is not needed high investments. When desired a CT (wireless) telephone option can be joined with the terminal, whereby mobility is achieved also in the location where the device is placed. It becomes possible to serve to the telephone user more places, where different charges for example at home, summer residence etc. are possible compared with that when the mobile terminal is used as being detached from the device.

Figure 2:
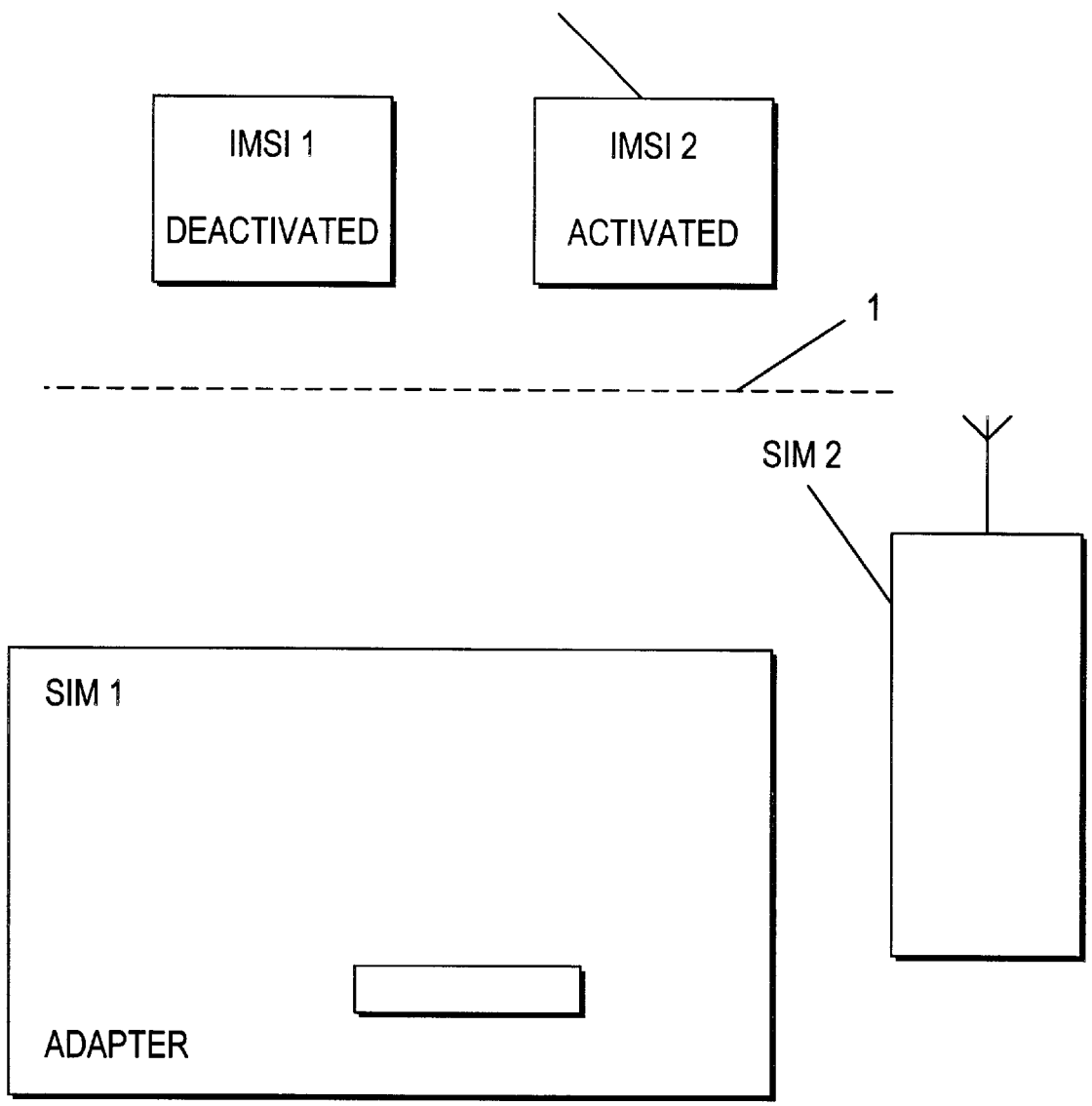

The invention is described in the following referring to the accompanying drawing, where FIG. 1 illustrates the method according to the invention, where the mobile station is attached to the device, FIG. 2 illustrates friction according to the invention, when the mobile station is detached from the device In FIG. 1 the mobile station MS is attached to a teleterminal mediator, in the following the adapters for example via a serial gate. The SIM 1 of the adapter controls the mobile station via a bus thus accomplished. Then the mobile telephone subscriber is provided by local subscriber characteristics and the mobile station-teleterminal adapter assembly is composed of the MS and adapter. When needed several terminals can be attached to the adapter. When the MS is attached to the adapter the IMSI 1-data of the adapter is activated by overtaking the IMSI 2 of the MS, which is at the same time deactivated (deactivation is not essential, depends on an application, other ways can be used). Then the calls made by the MS via the adapter are directed to the IMSI 1-charging data of the adapter. When the MS is detached from the adapter, the IMSI 1 of the adapter is deactivated or gets deacivates and the IMSI 2 of the SIM 2 of the MS is activated. Then the calls dialled from the MS are directed to the IMSI 2 charging data of the MS. Thus the calls can be separated from each other and they can be priced at the charging in different ways depending on whether the MS is attached to the adapter or detached therefrom, The adapter is a device, which includes the SIM-card having the IMSI-data, and which is capable to control the mobile station attached to the device and to sent into a network the IMSI-data. The calls coming to the mobile station are directed to the mobile station independing on whether the communication station is attached to the adapter or detached therefrom In case the communication station is detached and a call is coming to the number according to the IMSI of the adapter, the call is nevertheless directed to the mobile station in a normal way. The radio interface is marked by the number 1.

In FIG. 1 is illustrated the local subscriber state for the mobile telephone subscriber, therein the IMSI 1 is "on" or activated and in FIG. 2 the mobile subscriber state for the mobile telephone subscriber respectively, wherein the IMSI 2 is on or activated.

Several MS can be joined in series by chaining up. In practise it may not be reasonable to chain up more than two MS.

At the network site the service is accomplished by chaining up IMSI:s (international mobile subscriber identities), The subscriber himself can use one or several numbers (mobile telephone multiservice network, MSISDN is the mobile subscriber international ISDN number) depending on what kind of a service he prefers.

In order to prevent any misuse, i.e. removal of the adapter from its location or outside the agreed region, a) the size of the adapter is made big enough, b) current input is utilised by a network current solution, c) the adapter is without an antenna of its own buW a stationary, for example a wall or roof antenna is attached thereto for accomplishing radio transmissions, d) the adapter is provided with a motion or acceleration sensor, which when a limit adjusted therein is exceeded destroys the circuit or SIM-card of the adapter comprising the circuit and/or IMSI 1-data, e) the usage of the adapter is restricted inside only one so called home cell by means of a closed SIM, whereby the radio network monitors the signal data associating to the IMSI 1, and if the network senses with the communication transmission in the network any other identity than the one of the home cell the continuation of the usage of the IMSI 1 of the adapter is deactivated, f) the usage of the adapter is restricted inside only one so called home cell by means of a closed SIM. It is commonly known that within the radio network managed by a teleoperator the coverage areas of the base station overlap more or less each other and at the same time the radio networks managed by the teleoperators overlap each other. This feature in the radio network can be utilised for accomplishing a closed SIM such that base station configuration characteristic for a chosen use location or region is stored into the adapter and the same can be updated automatically at fixed time intervals. Into the said base station data is included as the first data the configuration of the base stations of managed by the teleoperator of the subscriber and as the second data the configuration of the base stations managed by other teleoperators. Then it is clear that in case both the first data and second data are alternated in the same time the adapter has been transferred, whereby the adapter destroys or prevents continuation usage of the IMSI 1 associating to the adapter. In this connection there is a reason to mention that the arrangement makes possible any change, repairing, improvement etc. activities, because then at a time is changed only either the first data or the second data.

It is possible that to the adapter is attached a telephone receiver or a wireless telephone device which are workable when the mobile station MS is placed to the adapter.

The adapter can include different functions like charging, several refer stations for telephones.

The invention is described above only by means of one preferred embodiment thereof and as it is evident to a skilled in the art several modifications and variations are possible within the scope of inventive idea defined in the attached claims.

I claim:

1. A method of charging for telephone calls made through a mobile telecommunications system having a base station which communicates with a subscriber that utilizes a mobile station to make the telephone calls wherein the mobile station comprises first and second subscriber identifying memory modules having common subscriber identity data and different charging data stored therein, comprising the steps of:

activating the first subscriber identifying memory module having first call charging data stored therein when the mobile station is in a predefined geographic region and deactivating the second subscriber identifying memory module;

activating the second subscriber identifying memory module having second call charging data stored therein when the mobile station is outside the predefined geographic region and deactivating the first subscriber identifying memory module; and monitoring through the telecommunications system a geographic position of the mobile station to determine whether the mobile station is in or out of the predefined geographic region so that when the mobile station is in the predefined geographic region, the calls made by the subscriber are charged according to the first call charging data.

2. A method of charging for telephone calls made through a mobile telecommunications system having a base station which communicates with a subscriber that utilizes a mobile station to make the telephone calls wherein the mobile station comprises first and second subscriber identifying memory modules having common subscriber identity data and different charging data stored therein, comprising the steps of:

activating the first subscriber identifying memory module having first call charging data stored therein when the mobile station is in a predefined geographic region and deactivating a second subscriber identifying memory module;

activating the second subscriber identifying memory module having second call charging data stored therein when the mobile station is outside the predefined geographic region and deactivating the first subscriber identifying memory module; and monitoring through the telecommunications system a position of the mobile station to determine whether the mobile station is in or out of the predefined geographic region so that when the mobile station is in the predefined geographic region, the calls made by the subscriber are charged according to the first call charging data, wherein the predefined geographic region is a home cell, and wherein said step of monitoring to determine whether the mobile station is in or out of the home cell comprises monitoring signals associated with the second subscriber identifying module such that if the telecommunications system senses a subscriber identity other than a subscriber identity associated with the second subscriber identity memory module in the home cell then the second subscriber memory module is deactivated.

3. A method of charging for telephone calls made through a mobile telecommunications system having a base station which communicates with a subscriber that utilizes a mobile station to make the telephone calls wherein the mobile station comprises first and second subscriber identifying memory modules having common subscriber identity data and different charging data stored therein, comprising the steps of:

activating the first subscriber identifying memory module having first call charging data stored therein when the mobile station is in a predefined geographic region and deactivating the second subscriber identifying memory module;

activating the second subscriber identifying memory module having second call charging data stored therein when the mobile station is outside the predefined geographic region and deactivating the first subscriber identifying memory module; and monitoring through the telecommunications system a position of the mobile station to determine whether the mobile station is in or out of the predefined geographic region so that when the mobile station is in the predefined geographic region, the calls made by the subscriber are charged according to the first call charging data, wherein said step of monitoring to determine whether the mobile station is in or out of the predefined geographic region comprises storing in a memory associated with the mobile station, base station configuration data which comprises information relating to management by a teleoperator of the subscriber and management of the base station by other teleoperators such that when both the information of the management by the teleoperator of the subscriber and the management of the base stations by the other teleoperators are alternated in a time continuation usage sequence of the data in the second subscriber identifying memory module, the first subscriber identifying memory module is deactivated.

4. A method of charging for telephone calls made through a mobile telecommunications system having a base station which communicates with a subscriber that utilizes a mobile station to make the telephone calls wherein the mobile station comprises first and second subscriber identifying memory modules having common subscriber identity data and different charging data stored therein, comprising the steps of:

activating the first subscriber identifying memory module having first call charging data stored therein when the mobile station is in a predefined geographic region and deactivating the second subscriber identifying memory module;

activating the second subscriber identifying memory module having second call charging data stored therein when the mobile station is outside the predefined geographic region and deactivating the first subscriber identifying memory module; and monitoring through the telecommunications system a geographic position of the mobile station to determine whether the mobile station is in or out of the predefined geographic region so that when the mobile station is in the predefined geographic region, the calls made by the subscriber are charged according to the first call charging data, wherein said step of monitoring to determine whether the mobile station is in or out of the predefined geographic region comprises detecting an adjustable limit that is set by a circuit in the mobile station, and if the adjustable limit is exceeded, disengaging, by the circuit, data transmission from the second subscriber memory identifying module.

5. An adapter for use in a mobile station of a mobile telecommunications system having a base station that allows the mobile telecommunications system to charge for calls made by a subscriber to the system according to charges for a predefined geographic region, comprising:

a first subscriber identifying memory module having first call charging data stored therein associated with the predefined geographic region and which is active when the mobile station is in the predefined geographic region and not active when the mobile station is not in the predefined geographic region;

a second subscriber identifying memory module having second call charging data stored therein associated with at least one other geographic region and which is active when the mobile station is not in the predefined geographic region and not active when the mobile station is in the predefined geographic region; and a circuit that communicates with the base station so that the system can determine whether the mobile station is in the predefined geographic region or out of the predefined geographic region so that when the mobile station is in the predefined region, the calls made by the subscriber are only charged according to the first call charging data.

* * * * *